US007009960B2

(12) United States Patent  
Ho

(10) Patent No.: US 7,009,960 B2
(45) Date of Patent: Mar. 7, 2006

(54) MEDIUM ACCESS CONTROL PROTOCOL FOR HIGH RATE WIRELESS PERSONAL AREA NETWORK

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 761 days.

(21) Appl. No.: 09/883,671

(22) Filed: Jun. 18, 2001

(65) Prior Publication Data

US 2002/0034172 A1   Mar. 21, 2002

Related U.S. Application Data

(60) Provisional application No. 60/232,757, filed on Sep. 15, 2000.

(51) Int. Cl.
*H04B 7/212* (2006.01)

(52) U.S. Cl. ............ 370/347; 370/338; 370/346; 370/442; 370/449

(58) Field of Classification Search ............ 370/322, 370/337–338, 345–348, 4, 431, 442, 449
See application file for complete search history.

(56) References Cited

U.S. PATENT DOCUMENTS

| | | | | |
|---|---|---|---|---|
| 4,549,293 A | * | 10/1985 | Christian et al. ......... 370/347 |
| 6,006,017 A | * | 12/1999 | Joshi et al. ............... 709/224 |
| 6,091,741 A | * | 7/2000 | Fujiwara et al. .......... 370/465 |
| 6,195,340 B1 | * | 2/2001 | Hatayama .................. 370/319 |
| 6,275,500 B1 | * | 8/2001 | Callaway et al. ......... 370/449 |
| 6,567,416 B1 | * | 5/2003 | Chuah ....................... 370/418 |
| 6,657,987 B1 | * | 12/2003 | Kumar et al. ............. 370/346 |

OTHER PUBLICATIONS

Lan Man Standards Committee of the IEEE Computer Society, Information technology—Telecommunications and information exchange between systems—Local and metropolitan area networks Specific requirements—Part 15.1: Wireless Personal Area Network Medium Access Control (MAC) and Physical Layer (PHY) Specifications, 2000, pp. i-773, IEEE P802-15/D0.7.2, New York, US: Some relevant sections include Ch. 7 dealing with Physical Layers (PHY) and Ch. 9 dealing with Link Management Protocol (LMP), other sections may also be of interest.

* cited by examiner

Primary Examiner—Ricky Q. Ngo
Assistant Examiner—Nittaya Juntima
(74) Attorney, Agent, or Firm—Ronald O. Neerings; Wade James Brady, III; Frederick J. Telecky, Jr.

(57) ABSTRACT

The MAC protocol of the present invention takes into account backward compatibility and conventional layering principles while introducing QoS parameters to describe and transport the QoS traffic. Minislots are also introduced in the protocol in the context of slots to reduce the transmission time of management, control, and data frames, and to facilitate channel bandwidth allocation, in response to increasing PHY rates. A highly efficient piconet joining process for wireless devices (e.g., IEEE 802.15.3 devices, etc.) is also provided by the protocol.

12 Claims, 4 Drawing Sheets

MEDIUM ACCESS CONTROL PROTOCOL FOR HIGH RATE WIRELESS PERSONAL AREA NETWORK

CROSS-REFERENCE TO RELATED APPLICATIONS

This application claims priority under 35 USC § 119(e)(1) of provisional application Ser. No. 60/232,757, filed Sep. 15, 2000.

TECHNICAL FIELD

This invention relates in general to the field of wireless communications and more specifically to a medium access control (MAC) protocol for a wireless personal area network.

BACKGROUND

Wireless Personal Area Networks (WPAN) as defined by Bluetooth (BT) 1.0 or IEEE Std 802.15.1 are being used by electronic devices like personal computers, cellular telephones, personal digital assistants (PDA's), etc., in order to communicate with one another and with peripheral devices. With the increasing need to exchange multimedia and large file applications, a need for a high rate WPAN providing for 20 million-bits-per-second (Mbps) or faster data rates is needed. One such high rate WPAN is the one being proposed by the Institute of Electrical and Electronic Engineers (IEEE) Std 802.15.3 high rate task group. Another such high rate WPAN is the one being enhanced by the Bluetooth Special Interest Group (SIG) as BT 1.x or BT 2.0. Such high rate wireless capability will provide for a better user experience, while providing improved network utilization efficiencies. With higher rate wireless services, unfortunately, come the problems associated with maintaining quality-of-service (QoS) over shared communication links. A need thus exists in the art for a medium access control (MAC) protocol that can provide for a high rate of transport which can support high bandwidth applications such as VoIP, video, Internet data, etc., while meeting a desirable QoS.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1A:
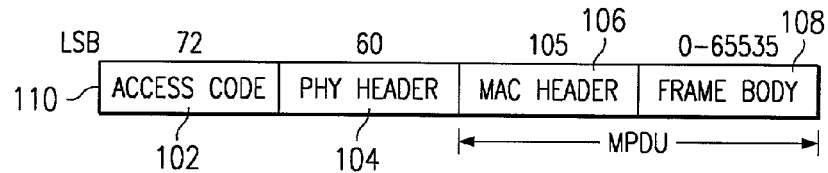
FIG. 1A shows a frame format based on the MAC protocol of the present invention.
Figure 1B:
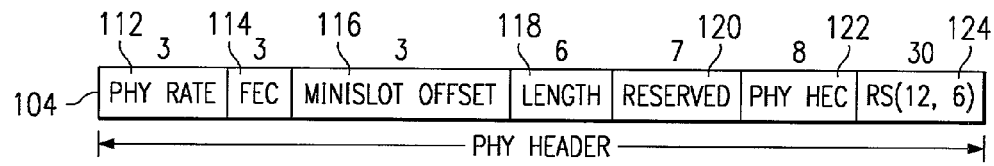
FIG. 1B shows a PHY Header format in accordance with the invention.
Figure 1C:
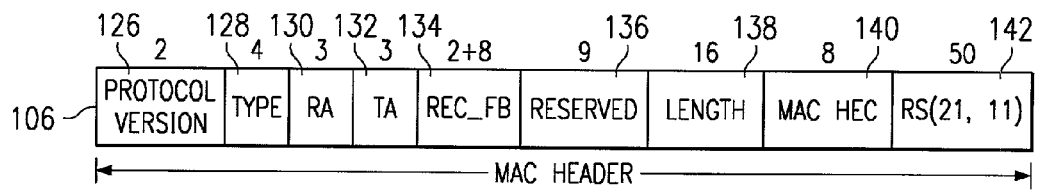
FIG. 1C shows a MAC Header format in accordance with the invention.
Figure 1D:
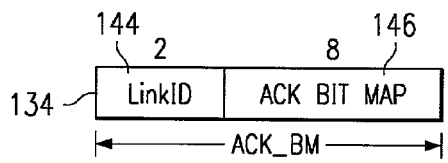
FIG. 1D shows an ACK_BM field format in accordance with the invention.

While the specification concludes with claims defining the features of the invention that are regarded as novel, it is believed that the invention will be better understood from a consideration of the following description in conjunction with the drawing figures.

The MAC protocol of the present invention maintains backward compatibility with the IEEE Std 802.15.1 network standard and conforms to the IEEE 802 layering architecture, while making efficient use of the high rate physical layer (PHY). The protocol has a high level of simplicity and is targeted for multimedia applications that require high channel throughput and QoS as compared to the IEEE Std 802.15.1 standard. The protocol provides for a link management that enables QoS based link setup for multimedia transport and activates multiple communication links between stations for simultaneous multiple services per station.

The protocol of the present invention has a link control that provides for effective channel access mechanisms for sending variable bit rate (VBR) and bursty traffic, as well as enforces QoS contracts and fair bandwidth usage while reducing radio frequency (RF) interference. The protocol also provides for a link utilization that enhances transmission rules to render the MAC less sensitive to future PHY and Application layer changes, while better utilizing lower layer services and accommodating various applications. The link utilization also extends the frame structure to accommodate new data rates, coding schemes, and acknowledgment/retransmission policies.

In FIG. 1 there is shown a frame format in accordance with the present invention. The frame 110 includes an Access Code field 102, a PHY Header field 104, a MAC Header field 106 and a Frame Body field 108. The Access Code field 102 is used for synchronization and DC offset compensation. The PHY Header field 104 is further broken down into a PHY Rate field 112, a Forward Error Correction (FEC) field 114, a Minislot Offset field 116, a Length field 118, a reserved field 120, a PHY Header Error Check (HEC) field 122 and a Reed-Solomon (RS) code field 124.

The MAC Header field 106 is broken down into a Protocol Version field 126, a Type field 128, a Receiver Address (RA) field 130, a Transmitter Address (TA) field 132, an Acknowledgment Bit-Map (ACK_BM) field 134, a Length field 138, a MAC HEC field 140 and a RS field 142. The ACK_BM 134 field is further broken down into a Link ID subfield 144 and a Sequence Bit Map subfield 146.

The MAC protocol of the present invention provides for QoS support in a number of service classes, which include delay sensitive constant bit rate (DS-CBR), delay sensitive variable bit rate (DS-VBR) and delay tolerant available bit rate (DT-ABR) service classes. The protocol also provides for service priority based on a number of levels including prescheduled DS-CBR on synchronous connection-oriented (SCO) links, priorities 7-5 (e.g., priority 7=highest priority) for DS-VBR, and priorities 4-0 (e.g., priority 0=best effort) for DT-ABR. The QoS information includes service class/ priority, token rate/bucket size, peak rate, delay/delay variation, and flush timeout (a zero value indicates no acknowledgment and a nonzero value indicates acknowledgment required).

In accordance with the MAC protocol of the present invention, the following new Link Management Protocol (LMP) Protocol Data Unit (PDU) extensions are provided:

(1). LMP_DS-CBR_link_req: This extension is used for requesting transport of DS-CBR session traffic and provides for (includes):

Link ID: gives identification of multiple DS-CBR unidirectional links between two stations;

Direction: indicates whether the link is for transmission from or to the requesting station;

Supervision TO: states the supervision timeout for the link;

$D_{DS-CBR}$ and $T_{DS-CBR}$: correspond to $D_{SCO}$ and $T_{SCO}$, respectively, as defined by IEEE Std 802.15.1; and $d_{DS-CBR}$: marks the offset, in minislots, from the slot boundary defined by $D_{DS-CBR}$ (2). LMP_QoS_link_req: This extension is used for requesting transport of DS-VBR or DT-ABR (except best effort) session traffic and provides (includes);

Link ID: gives identification of multiple QoS unidirectional links between two stations;

Direction: indicates whether the link is for transmission from or to the requesting station;

Supervision TO: states the supervision timeout for the link; and

QoS values: specify the QoS expectations for the link.

(3). LMP_remove_DS_CBR_link_req: This extension is used for requesting removal of a DS-CBR link.

(4). LMP_remove_QoS_link_req: This extension is used for requesting removal of a QoS link.

In accordance with the LMP PDU extensions of the present protocol, no LMP PDUs are required with asynchronous connectionless (ACL) links for transporting best-effort session traffic.

Based on the prior art as described in IEEE Std 802.15.1 for SCO links:

SCO links—legacy stations:
  between master and slave only;
  periodic paired slots for voice traffic only;
  only three periods, 2, 4 and 6 slots, allowed; and
  allocated bidirectionally per voice call;

the following SCO link extensions are also provided with the present invention:

DS-CBR links—new stations:
  from any station to any other station within same piconet;
  periodic minislots for delay sensitive constant bit rate (DS-CBR) traffic;
  configurable period as determined by QoS values;
  allocated unidirectionally per DS-CBR session; and
  subject to adjustment by the master at/for a given time.

Based on the prior art as described in IEEE Std 802.15.1 for ACL links:

ACL links—legacy stations:
  single link between master and slave only;
  paired slots for asynchronous (best effort) data; and
  allocated bidirectionally per frame transmission;

the following ACL link extensions are further provided with the present invention:

(1). ACL links—new stations:
  best effort link from any station (LinkID=0);
  aperiodic minislots for asynchronous (best effort) data; and
  allocated unidirectionally per sequence of frame transmissions.

(2). QoS links—new stations:
  multiple links from any station to any other station within the same piconet;
  quasi-periodic minislots for DS-VBR session traffic;
  allocated by permit (separate/piggybacked) per quasi-period;
  available minislots for DT-ABR session traffic; and
  allocated by reservation and permit/multi-permit per data burst.

The protocol of the present invention also includes the following MAC features and extensions:

Slot as frame transmission unit for legacy stations only;
Alternate slot use by master and slave for legacy stations only;
Minislot as frame transmission unit: in the preferred embodiment 1 slot=8 minislots+8 IFSs (Inter-Frame Spaces);
Frame transmission across multiple minislots: no IFS in between;
Acknowledgment and retransmission: sequential and selective;
Minislot allocation for traffic transport: controlled by master;
Permit and M-Permit control frames: efficient access mechanisms;
Direct transmission between stations: is provided for new stations.
Hold, Sniff, Park modes: slot based for legacy stations, minislot based for new stations;
Frame structure: existing format for legacy stations, new format for new stations;
Frame format: known prior to transmission/reception; and
PHY rate selection (instructed by MAC): legacy PHY if legacy related, high rate PHY if MAC extended.

Piconet Joining Processes

Figure 7:
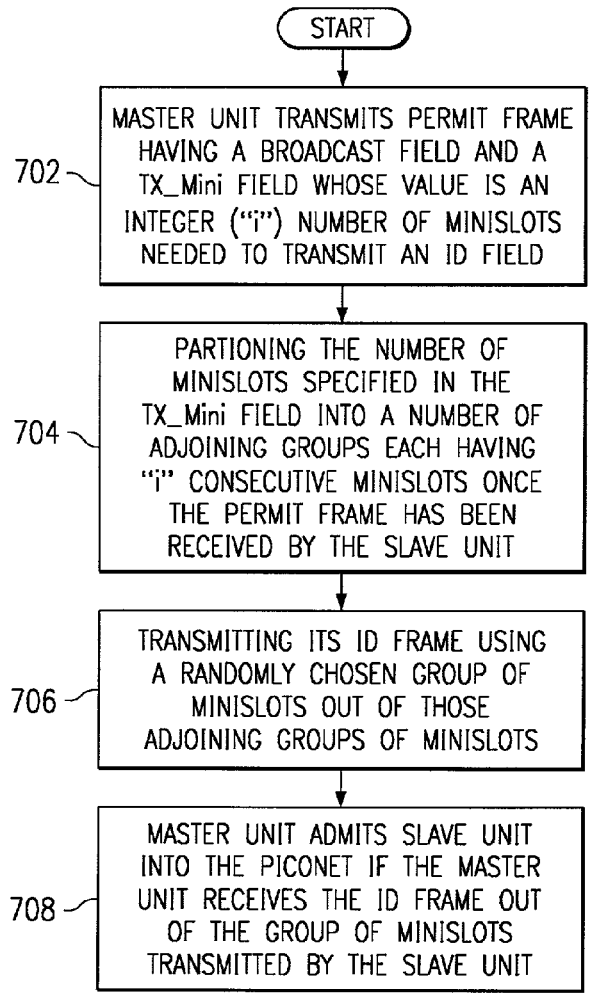
FIG. 7 shows a flowchart highlighting the steps taken in order for a slave unit to join a piconet in accordance with the preferred embodiment.

In accordance with the protocol of the present invention, the master unit regularly (subject to bandwidth availability) sends Permit frames containing a broadcast RA field (=000) and a TX_Mini field whose value is an integer multiple of the number of minislots, "i", needed for transmitting an ID frame at the lowest transmission rate mandated for a new station, shown in step 702 of FIG. 7. A slave unit seeking to join a piconet waits until receiving such a Permit frame. It then, in step 704, partitions the minislots specified by the TX_Mini field into a number of adjoining groups each of "i" consecutive minislots, and then, in step 706, transmits its ID frame into a randomly chosen group of minislots out of those groups back to the master unit.

If a master successfully receives an ID frame out of one of the groups of minislots defined above, it will begin the process of admitting that slave into the piconet in step 708. If the master detects one or more collisions in the groups of minislots, it will, within a preset time limit, send another Permit frame containing a broadcast RA field (=000) and a TX_Mini field whose value is chosen for a rapid resolution of the collisions. The above steps are repeated until no more collisions are detected or the master decides to suspend the issuance of Permit frames as defined above although there may be stations still attempting to join the piconet.

Frame Format

A more detailed discussion of the frame format shown in FIG. 1 follows:

PHY Header

Referring back to FIGS. 1A–1D, the PHY Header session 104 is transmitted at the lowest high rate (LHR). The PHY Rate section 112 provides information on the modulation technique used and the bit rate pertaining to the MAC protocol data unit (MPDU). The FEC section 114 provides information on the forward error correction scheme pertaining to the MPDU. The Minislot Offset section 116 provides information on the offset of the frame start from slot boundary in minislots. The Length section 118 states the length of the frame in minislots. The PHY HEC section 122 provides the PHY header error check, while the RS (12, 6) section 124 provides for a shortened Reed-Solomon code over GF (32). The MPDU is coded and transmitted according to the PHY rate found in section 112 and the FEC value found in section 114 in the PHY Header 104.

MAC Header

The MAC Header 106 includes the Protocol Version field 126, which provides the highest protocol version implemented by the particular station (e.g., PDA, etc.). The Type field 128 indicates whether the frame is of type Management, Control, Data-NoAck, or Data-Ack. The RA field (receiver address) 130 provides information on the receiver's address which is "0" for the master unit. The TA field (transmitter address) 132 provides information on the transmitter's address which is "0" for the master unit.

The ACK_BM field 134 is the acknowledgment bit map, comprising a Link ID pertaining to the link being acknowledged and a Sequence Bit Map wherein a "1"/"0" in the nth (n=1–8) position is a positive/negative acknowledgement to a frame with minislot number n−1 in the last sequence of frames transmitted from the Link ID, and starting from minislot number 0 (up to 8 frames from a given Link ID may be pending acknowledgment). The Length field 138 provides the length of the Frame Body in bits. The MAC HEC field 140 is the MAC header error check, and the RS (21, 11) field 142 provides the shortened Reed-Solomon code over GF(32).

Management Frames

Figure 2:
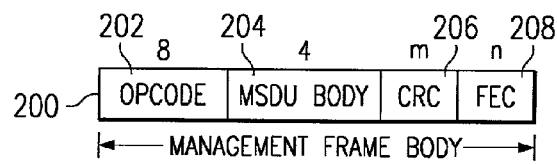
FIG. 2 shows a Management Frame Body in accordance with the invention.

Referring now to FIG. 2, there is shown a Management frame 200 (Type 000) used for sending LMP PDUs in accordance with the protocol. The Management frame 200 includes an 8-bit opcode field 202 that provides the Management frame Opcode as defined by the IEEE 802.15.1 specification, a 4-bit Frame Body field 204 that provides the LMP message, and an m-bit CRC 206 field that provides error checking, and an n-bit FEC 208 field that provides error correction and is coded according to the FEC value in the PHY Header.

Control Frames

Figure 3:
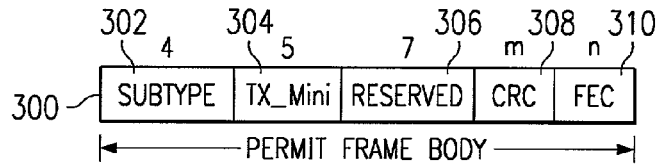
FIG. 3 shows a Permit Frame Body in accordance with the invention.
Figure 4:
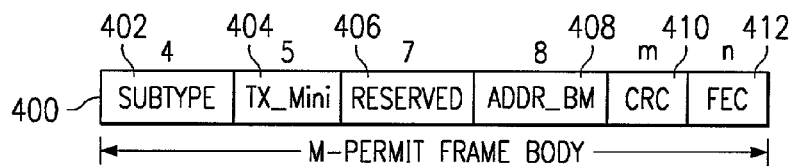
FIG. 4 shows an M-Permit Frame Body in accordance with the invention.

Referring to FIGS. 3 and 4, there are shown a Permit frame 300 and an M-Permit frame 400 in accordance with the protocol of the present invention used with new stations. The Permit frame 300 includes a Subtype field 302 equal to "0001", and the M-Permit frame 400 includes a Subtype field 402 equal to "0010". A TX_Mini field 304 (in minislots) provides information on the permitted maximum transmission time (in minislots) for the station addressed by the Permit frame, while the permitted maximum transmission time for each of the stations mapped in the M-permit frame is provided by a TX_Mini field 404. Reserved fields 306 and 406 are currently reserved and not in use. The CRC fields 308 and 410 provide for error checking, while the FEC fields 310 and 412 provide for error correction and are coded according to the FEC value 114 in the PHY Header 104. The M-Permit Frame Body 400 includes an address bit map field (ADDR_BM) 408 wherein a "1" in the nth (n=0–7) position indicates the station with an address value of n is given a transmission opportunity by this M-Permit frame.

Data-NoAck/Data-Ack Frames

Figure 5:
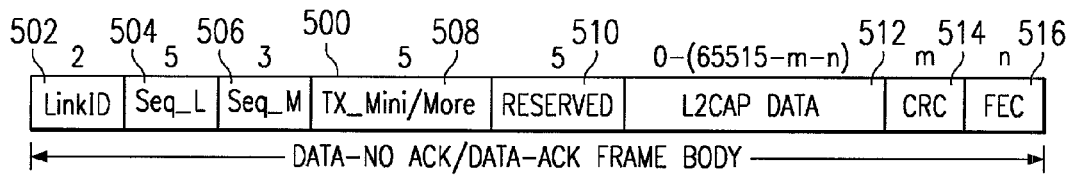
FIG. 5 shows a Data-NoAck/Data-Ack Frame Body in accordance with the invention.

In FIG. 5, there is shown a Data-NoAck/Data-Ack frame 500 used by the protocol. Frame 500, Data-Ack, with type 0101 is used for sending Logical Link Control and Adaptation Protocol (L2CAP) messages requiring acknowledgment. Frame 500, Data-NoAck, with type 0100 is used for sending L2CAP messages requiring no acknowledgment. Frame 500 includes a LinkID field 502 that identifies the link between the transmitting/receiving stations. The Seq_L field 504 provides the sequence number for identifying MAC frames of the same L2CAP frame (frames received with the same Seq_L are discarded but acknowledged if required). The Seq_M field 506 provides the minislot number for identifying transmitted frames pending acknowledgment (when all frames transmitted are acknowledged, the transmitting station restarts Seq_M from 0). The TX_Mini/More field 508 is used as a "TX_Mini" field for transmission from a master unit that provides a piggybacked permit of the maximum transmission time (in mini slots) allowed for a slave receiving this frame. The TX_Mini/More field 508 is used as a "More" field for transmission from a slave unit that provides a piggybacked indication by the sending slave of whether there is (no) more data waiting at this slave, via a "1" or "0" in the first bit depending on the design, and if so, the highest service priority of the waiting traffic, via the next 3 bits. Finally, the CRC 514 field provides error checking capability and the FEC 516 field provides error correction capability, coded according to the FEC value on the PHY Header (not necessarily appearing as shown).

Channel Access Mechanisms

Further channel access mechanisms are provided by the protocol which provides for improved channel access over the existing IEEE Std 802.15.1. According to the protocol, channel bandwidth usage/allocation is determined by the master unit based on QoS values of admitted traffic as indicated through the LMP_QoS-link_req messages, or on a best effort in the case of no link setup. The Permit/M-Permit frames are sent by the master unit as often as warranted by the QoS contracts indicated though LMP_QoS-link_req messages, and further in view of channel bandwidth availability.

DS-CBR traffic is prescheduled, and sent periodically, through the setup of a DS-CBR link by the LMP_CBR_link_req frame. DS-VBR traffic from a slave to a master or another slave is transmitted after quasi-periodic Permit/M-Permit frames are sent by the master, with the "More" field used by the sending slave to piggyback indication of waiting data buffered at that slave. DT_ABR traffic is directly transmitted as guided by Permit and M-Permit frames sent by the master, or through reservation as done by piggyback using "More" field or by use of Permit and M-Permit frames.

Figures 6A, 6B:
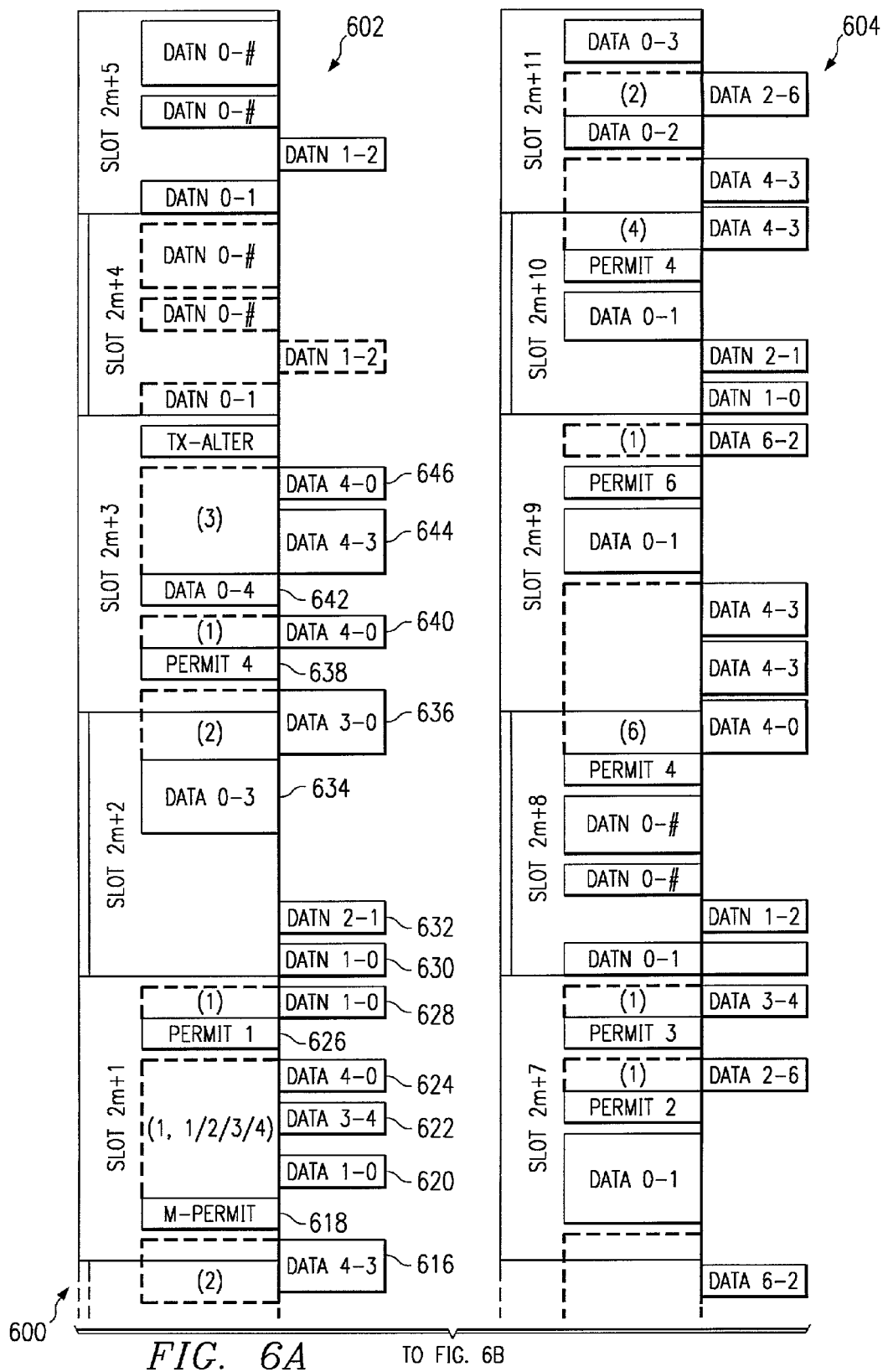
FIG. 6 shows frame transmission illustrations using the protocol of the present invention.
Figure 6B:
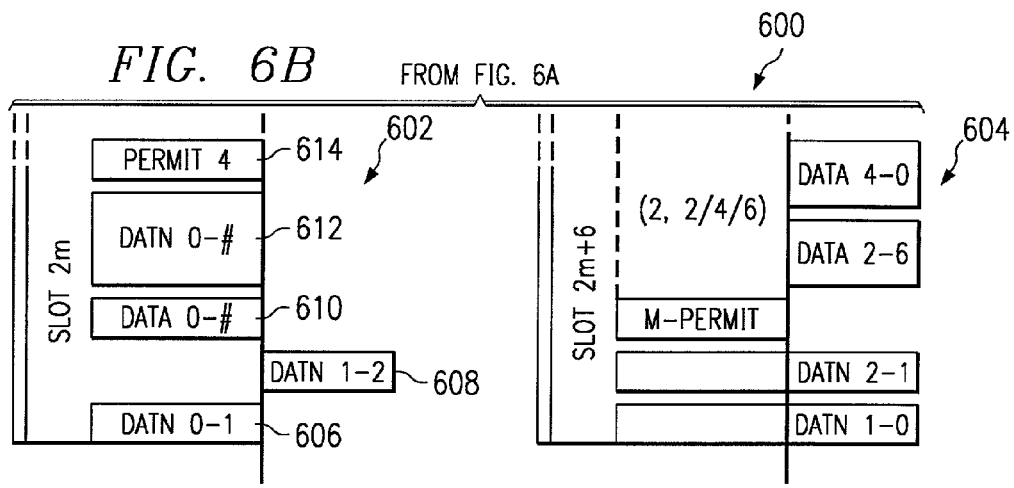

In FIG. 6, there is shown an illustration of a typical frame transmission sequence using the protocol of the invention for illustrative purposes. The frame transmissions 600 include a number of slots commencing with "slot 2m" 602 through "slot 2m+11" 604. Slot 2m 602 includes DS-CBR Data-No Ack frames (voice) such as 606 (Datn 0-1, from master to slave 1), 608 (Datn 1-2, from slave 1 to slave 2), and 610 (Datn 0-#, from master to every slave in the piconet), all prescheduled and sent on DS-CBR links. Slot 2m 602 also includes a DS-VBR Data-NoAck frame (video)

612 (Datn 0-#, broadcast by master) on a QoS link, a Permit frame 614 (Permit 4) sent by the master to slave 4 for 2 minislots of transmission time. Beginning on slot 2m 602, a DS-VBR Data_Ack frame (video) 616 (Data 4-3) is sent by slave 4 to slave 3 on a QoS link in response to the preceding Permit 4 (610).

On slot 2m+1 there is an M-Permit frame (TX_Mini=1, ADDR_BM=01111000) 618. The M-permit is sent by the master to slaves numbered 1, 2, 3 and 4 for 1 minislot each of transmission time. Slot 2m+1 includes DT-ABR data frames 620 (Data 1-0, from slave 1 to master), 622 (Data 3-4, from slave 3 to slave 4), and 624 (Data 4-0, from slave 4 to master), all sent on QoS links in response to the M-Permit frame 614, but none from slave 2 even though slave 2 could have used the minislot after slave 1. Also on slot 2m+1 is another Permit frame 626 (Permit 1) sent by the master to slave 1, from which a DT-ABR data frame 628 (Data 1-0) is returned to the master via an ACL link.

Slot 2m+2 begins with DS-CBR Data-NoAck frames (voice) 630 (Datn 1-0, from slave 1 to master) and 632 (Datn 2-1, from slave 2 to slave 1), both prescheduled and transmitted on DS-CBR links. Some idle minislots elapse before a DS-VBR frame 634 (Data 0-3) is sent on a QoS link from the master to slave 3 with a piggybacked permit of 2 minislots (TX_Mini=2), for the transmission of a DT-ABR data frame 636 (Data 3-0) from slave 3 back to the master on another QoS link.

On slot 2m+3, the master sends another Permit frame 638 (Permit 4) to slave 4, which then sends a DT-ABR Data-Ack frame 640 (Data 4-0) back to the master on an ACL link. The returned frame 640 sets the More field to 1006, indicating a piggybacked request for transmitting priority 6 data (video). A small DT-ABR Data-Ack frame 642 (Data 0-4) is then sent by the master to slave 4 along with a piggybacked permit of 3 minislots (TX_Mini=3). The first two of these minislot are used for sending a priority 6 DS-VBR Data-Ack frame 644 (Data 4-3) by slave 4 to slave 3, while the last minislot is left for sending a DT-ABR Data-Ack frame 646 (Data 4-0) back to the master, with a piggybacked More field set to 0000 as an indication of no additional waiting data for transport.

Figure 8:
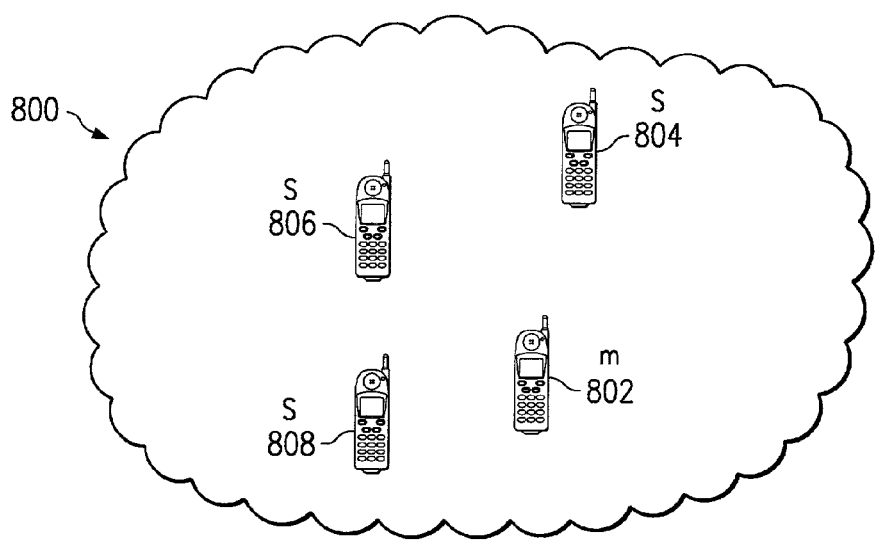
FIG. 8 shows a diagram of a wireless network in accordance with the invention.

Referring now to FIG. 8, there is shown a diagram of a wireless network 800 which supports the protocols discussed herein. Network 800 includes a plurality of wireless transceivers including a master unit 802 and a plurality of slave units 804.

Using the protocol of the present invention, channel access for bursty traffic can be handled efficiently through M-Permit frames sent by master and the More field piggybacked in frames sent by the slave units. The master unit transmits without wasting much channel bandwidth. The M-Permit frame, whenever bandwidth is available, allocates a small number of minislots to slaves that are active but have not sent data on a periodic basis. Those slaves that have data to send use the More field to indicate more data is buffered. The Master unit allocates additional minislots to such slave units using the Permit and M-Permit frames.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. The present invention provides for an easy and cost effective way of potential buyers of electronic devices/systems to evaluate a part over the Internet. In this way a potential customer can save the time and expense of buying and using an evaluation board to test a part he/she is considering to purchase.

The invention claimed is:

1. A method for providing efficient channel access using a medium access control (MAC) protocol for use in wireless networks having one master and a plurality of slave units, the method comprising the steps of:

transmitting a first frame (M-Permit frame) from the master unit, the first frame provides information to one or more slave units from amongst the plurality of slave units addressed by the first frame on the maximum transmission time in minislots each one of the one or more slave units may transmit in sequence after the reception of the first frame;

transmitting a second frame (Permit frame) from the master unit, the second frame is addressed to a particular slave unit from amongst the plurality of slave units and provides information to that particular slave unit on the maximum transmission time it has in minislots following reception of the second frame; and wherein the minislots each comprises a frame transmission time unit which is smaller than the size of a slot used by units compliant with the IEEE 802.15.1 standard and there are a predetermined number of minislots and interframe spaces (IFS) per said slot.

2. A method as defined in claim 1, wherein the slave units can perform frame transmissions across multiple minislots with no interframe spaces (IFS) in between the multiple minislots.

3. A method as defined in claim 1, wherein the MAC protocol is backward compatible with and supports legacy IEEE 802.15.1 compliant slave units using slots as frame transmission time units.

4. A method as defined in claim 1, wherein the master unit controls the allocation of minislots to the plurality of slave units.

5. A method as defined in claim 1, wherein two of the slave units from amongst the plurality of slave units can communicate directly with each other.

6. A method as defined in claim 1, further comprising the step of:

transmitting a data-no-acknowledgement (Data-NoAck)/data-acknowledgement (Data-Ack) frame having a field (TX_Mini/More) that when transmitted by the master unit provides to the slave unit receiving the transmission a piggybacked permit of the maximum transmission time in minislots allowed for the slave receiving the frame.

7. A method as defined in claim 6, wherein the field (TX_Mini/More) is used by the slave unit that received the data-no-acknowledgement (Data-NoAck)/data-acknowledgement (Data-Ack) frame when transmitting to the master unit as a piggybacked indication by the slave unit of whether there are more data waiting at this slave to be transmitted.

8. A method as defined in claim 7, wherein when used as a piggybacked indication by the slave unit the filed (TX_Mini/More) provides information to the master unit if whether or not there is data waiting to be transmitted and if so, the highest service priority of the data waiting to be transmitted.

9. A medium access control (MAC) protocol for use in wireless networks, the MAC protocol is backward compatible with IEEE standard 802.15.1 wireless devices, the MAC protocol providing a method of efficient communications and including a master unit and a plurality of slave units, the method comprising the steps of:

allowing one or more slave units from amongst the plurality of slave units that only support the IEEE standard 802.15.1 to use slots as frame transmission time units;

allowing one or more slave units from amongst the plurality of slave units to use minislots which are smaller than the slots as their frame transmission time units; and wherein the slave unit can perform frame transmissions across multiple minislots with no interframe spaces (IFS) in between the multiple minislots.

10. A method as defined in claim 9, wherein the master unit transmits a first type of frame (Permit frame) to a slave unit amongst the plurality which provides information to that particular slave unit on the maximum transmission time it has in minislots following reception of the first type of frame.

11. A wireless network, comprising:

a master unit;

a plurality of slaves;

the master unit transmits a first frame (M-Permit frame) that provides information to one or more slave units from amongst the plurality of slave units addressed by the first frame on the maximum transmission time in minislots each one of the one or more slave units may transmit in sequence after the reception of the first frame;

the master unit transmits a second frame (Permit frame) that is addressed to a particular slave unit from amongst the plurality of slave units and provides information to that particular slave unit on the maximum transmission time it has in minislots following reception of the second frame; and wherein there are a predetermined number of minislots and interframe spaces (IFS) per slot and the plurality of slave units can perform frame transmissions across multiple minislots with no interference space (IFS) in between the multiple minislots.

12. A wireless network as defined in claim 11, wherein the minislots each comprises a frame transmission time unit which is smaller than the size of a slot as defined by the IEEE 802.15.1 standard.

* * * * *